(12) United States Patent
Hansen

(10) Patent No.: US 8,515,562 B2
(45) Date of Patent: Aug. 20, 2013

(54) PROCESS SIMULATION IN A COMPUTER BASED CONTROL SYSTEM

(75) Inventor: Kai Hansen, Oslo (NO)

(73) Assignee: ABB Research Ltd., Zurich (CH)

( * ) Notice: Subject to any disclaimer, the term of this patent is extended or adjusted under 35 U.S.C. 154(b) by 185 days.

(21) Appl. No.: 11/976,386

(22) Filed: Oct. 24, 2007

(65) Prior Publication Data

US 2008/0177396 A1    Jul. 24, 2008

(30) Foreign Application Priority Data

Oct. 24, 2006  (EP) .................................. 06122795

(51) Int. Cl.
*G05B 15/02*     (2006.01)
*G06F 19/00*     (2011.01)
*G06F 17/50*     (2006.01)

(52) U.S. Cl.
USPC ................... 700/26; 703/13; 703/20; 703/21; 703/22; 703/24; 703/23; 703/27; 370/395.54; 709/245

(58) Field of Classification Search
USPC .. 700/26; 703/13, 22; 709/245; 370/395.54
See application file for complete search history.

(56) References Cited

U.S. PATENT DOCUMENTS

| | | | | |
|---|---|---|---|---|
| 5,818,736 | A | * | 10/1998 | Leibold ............................ 703/16 |
| 5,826,060 | A | * | 10/1998 | Santoline et al. ................. 703/6 |
| 5,907,696 | A | * | 5/1999 | Stilwell et al. .................. 703/13 |
| 6,631,137 | B1 | * | 10/2003 | Lorrain et al. ................. 370/401 |
| 7,006,963 | B1 | * | 2/2006 | Maurer ............................ 703/21 |
| 7,110,835 | B2 | * | 9/2006 | Blevins et al. .................. 700/83 |
| 7,162,385 | B2 | * | 1/2007 | Scharold et al. .............. 702/108 |
| 7,487,075 | B2 | * | 2/2009 | Martin et al. .................... 703/13 |
| 7,523,127 | B2 | * | 4/2009 | Chen-Wright et al. ............... 1/1 |
| 7,584,088 | B2 | * | 9/2009 | Martin et al. ................... 703/13 |

(Continued)

FOREIGN PATENT DOCUMENTS

| | | |
|---|---|---|
| DE | 102004031573 | 8/2005 |
| JP | 2001-209407 | * 3/2001 |
| WO | WO 97/19392 | 5/1997 |
| WO | WO 2004/031874 | 4/2004 |

OTHER PUBLICATIONS

Gse Systems, Simulation Software for the process Industries, http://www.gses.com/docs/simsuitepro/0903%20SSPro%20Data%20Sheet%20%20DS%2012%20VD%20HQ.pdf, pp. 1-2, SSPRO, pp. 1-2 , 2003.*

(Continued)

*Primary Examiner* — Ryan A. Jarrett
*Assistant Examiner* — Olvin Lopez Alvarez
(74) *Attorney, Agent, or Firm* — Birch Stewart Kolasch & Birch, LLP

(57) ABSTRACT

A computer based control system including a field network to which field devices equipped with hardware addresses and logical names are to be connected, a control device performing addressing control in relation to the field devices and their logical addresses and a simulation handling device. The simulation handling device has an own logical address, an own hardware address and is capable of obtaining a logical address, as well as possibly a logical name and/or a hardware address of at least one field device involved in the simulation. It notifies the control device that the field device is connected to the field network, detects a control signal directed towards field device addressed using the logical and/or hardware address of this field device and responds to the control signal with simulation results using the same logical and/or hardware address as the source of the response.

28 Claims, 2 Drawing Sheets

(56) References Cited

U.S. PATENT DOCUMENTS

| | | | | |
|---|---|---|---|---|
| 7,895,360 | B2* | 2/2011 | Lockridge et al. | 709/242 |
| 2003/0036896 | A1* | 2/2003 | Skingsley et al. | 703/21 |
| 2004/0078182 | A1* | 4/2004 | Nixon et al. | 703/22 |
| 2004/0122645 | A1* | 6/2004 | Shevenell et al. | 703/21 |
| 2005/0172258 | A1* | 8/2005 | Nixon et al. | 717/100 |
| 2005/0177762 | A1* | 8/2005 | Singh et al. | 714/4 |
| 2005/0180439 | A1* | 8/2005 | Kondo et al. | 370/401 |
| 2006/0058929 | A1* | 3/2006 | Fossen et al. | 701/21 |
| 2006/0182124 | A1* | 8/2006 | Cole et al. | 370/395.54 |
| 2007/0297600 | A1* | 12/2007 | Narayanan et al. | 379/413.03 |
| 2011/0222407 | A1* | 9/2011 | Matsuo et al. | 370/241 |

OTHER PUBLICATIONS

David Plummer, "An Ethernet Address Resolution Protocol", http://tools.ietf.org/html/rfc826, pp. 1-16, Nov. 1982.*

Mynah, "Powerful soultion for digital Plants", pp. 1-15, cited by other in 2006.*

Weighing-Systems.com "Fieldbus overview", "http://www.weighing-systems.com/TechnologyCentre/fieldbus1.html", 2010, pp. 1-3.*

Georg Lang "EP 0862763 Translation", 1998, pp. 0-17.*

Mimic "Process Simulation Software", 2003, pp. 1-15.*

EPO, "MAchine translation of foreign patent DE 102004031573", Aug. 18, 2005, pp. 1-2.*

EPO, "Machine translation of foreign patent DE 10245176", Apr. 1, 2004, pp. 1-2.*

Bradford et al, "A parallel Discrete Event IP network Emulator", Sep. 2000, pp. 8.*

European Search Report—Aug. 20, 2007.

European Examination Report—Aug. 20, 2007.

* cited by examiner

PROCESS SIMULATION IN A COMPUTER BASED CONTROL SYSTEM

TECHNICAL FIELD OF THE INVENTION

The present invention relates to the field of simulations with regard to field devices computer based control systems. The present invention more particularly relates to a method, simulation handling device and computer program product for handling simulations related to at least one field device to be provided in a field network of a computer based control system as well as to such a computer based control system.

DESCRIPTION OF RELATED ART

Computer based control systems are widely used in a number of different industrial environments, such as for instance pulp and paper process and oil and gas production processes and electrical power production processes. These control systems typically include one or more control devices in the form of controllers. Such a controller then normally controls so called field devices via a field bus, where the field devices are normally used to measure or influence properties of a process. As is evident from the examples given above, these systems can thus be provided in a hazardous environment. It is then very important that the functionality of the field devices is tested beforehand through performing simulations in order to guarantee as far as possible that an up and running system does not encounter any faults that may be dangerous. Such simulations are important also if the system is not provided in a hazardous environment, since faults can be detected early and corrected, which may lead to avoiding of mistakes that may be economically costly in a running system.

Therefore simulation programs and simulators have been developed for simulating the functionality of field devices.

EP 862 763 describes such a simulating unit which may be connected to a field bus connected to a controller. It is here described how the controller here runs a process in real-time that is simulated by the simulator instead of a number of field devices. The controller does not realize that it communicates with a simulator and not with field devices. The document does not mention how the simulator is able to perform this and it does especially not mention what types of addresses are used and how.

WO 2004/031874 describes another simulator, here denoted virtual field device, to be used together with a controller on a field bus. The field bus is not described in any detail, but it is clear that it operates at a much slower speed than a data bus operating according to the HSE standard. Neither does the document describe much about addresses used. The document does describe that a virtual field device can be combined with a real field device and then this combination has an own device name and own device identity.

Field buses have traditionally been provided in local networks, where proprietary addresses are used and then the proprietary address is the hardware address of the device. Examples of such network are PROFIBUS, Foundation Fieldbus and Device Net.

However nowadays it is becoming more and more common to use a logical addressing scheme like IP-addressing also on the field bus level, i.e. in field networks. This means that a control device will provide the field device with such a logical address. Here it is not possible for new devices, like for instance a simulator, to identify itself using the logical address of another entity. It is at the same time important that the controller operates as usual, i.e. that it does not perceive that it is communicating with anything else than a real field device.

There is therefore a need for allowing a control device that uses logical addresses for field devices to communicate with a simulation function but still without noticing that a real field device is not at hand.

SUMMARY OF THE INVENTION

The present invention is therefore directed towards allowing a control device that uses logical addresses for field devices to communicate with a simulation function without noticing that a real field device is not at hand.

One object of the present invention is therefore to provide a method for handling simulations related to at least one field device that allows a control device that uses logical addresses for field devices to communicate with a simulation function without noticing that a real field device is not at hand.

This object is according to a first aspect of the present invention achieved through a method for handling simulations related to at least one field device to be provided in a field network of a computer based control system in relation to a simulation handling device, where the field device is to be controlled by a control device that performs addressing control in relation to logical addresses for field devices equipped with hardware addresses and logical names, where the simulation handling device has its own logical address and its own hardware address and is capable of obtaining the logical address as well as possibly the logical name and/or the hardware address of at least one field device to involved in the simulation, the method being performed in the simulation handling device and comprising the steps of:
notifying the control device that the field device involved in the simulation is connected to the field network,
detecting a control signal directed towards the field device involved in the simulation and addressed using the logical and/or hardware address of this field device, and
responding to the control signal with simulation results related to the process using the logical and/or hardware address of this field device as the source of the response.

Another object of the present invention is to provide a simulation handling device for handling simulations related to at least one field device that allows a control device that uses logical addresses for field devices to communicate with a simulation function without noticing that a real field device is not at hand.

This object is according to a second aspect of the present invention achieved through a simulation handling device for handling simulations related to at least one field device to be provided in a field network of a computer based control system, where the field device is to be controlled by a control device that performs addressing control in relation to logical addresses for field devices equipped with hardware addresses and logical names, wherein said simulation handling device comprises:
a contact information store comprising an own logical address, an own hardware address, a logical address, a logical name and a hardware address of at least one field device involved in the simulation,
a communication handling unit configured to
  notify the control device that the field device involved in the simulation is connected to the field network,
  detect a control signal directed towards the field device involved in the simulation and addressed using the logical and/or hardware address of this field device, and
  respond to the control signal with simulation results using the logical and/or hardware address of this field device as the source of the response.

Another object of the present invention is to provide a computer program product for handling simulations related to at least one field device that allows a control device that uses logical addresses for field devices to communicate with a simulation function without noticing that a real field device is not at hand.

This object is according to a third aspect of the present invention achieved through a computer program product for handling simulations related to at least one field device to be provided in a field network of a computer based control system, where the field device is to be controlled by a control device that performs addressing control in relation to logical addresses for field devices equipped with hardware addresses and logical names, where a simulation handling device has its own logical address and its own hardware address and is capable of obtaining the logical address as well as the logical name and/or the hardware address of at least one field device involved in the simulation, comprising computer program code to make the simulation handling device perform when said code is loaded into said simulation handling device:
notify the control device that the field device involved in the simulation is connected to the field network,
detect a control signal directed towards the field device involved in the simulation and addressed using the logical and/or hardware address of this field device, and
respond to the control signal with simulation results using the logical and/or hardware address of this field device as the source of the response.

Another object of the present invention is to provide a computer based control system that allows a control device in the system that uses logical addresses for field devices to communicate with a simulation function without noticing that a real field device is not at hand.

This object is according to a fourth aspect of the present invention achieved through a computer based control system comprising:
a field network to which at least one field device that is equipped with a hardware address and a logical name is to be connected,
a control device connected to said field network and configured to control the field devices and perform addressing control in relation to logical addresses of these field devices, and
a simulation handling device comprising:
  a contact information store comprising an own logical address, an own hardware address, a logical address, a logical name and a hardware address of at least one field device involved in the simulation,
  a communication handling unit configured to
    notify the control device that the field device involved in the simulation is connected to the field network,
    detect a control signal directed towards the field device involved in the simulation and addressed using the logical and/or hardware address of this field device, and
    respond to the control signal with simulation results using the logical and/or hardware address of this field device as the source of the response.

The present invention has many advantages. It allows the provision of processing results to a control device without the control device knowing that field devices are actually not connected. In this way it is thus possible to test the functionality of the control device before being actively used. Therefore faults that may be dangerous in a hazardous environment can be avoided. Faults can also be detected and corrected early, which may lead to avoiding of mistakes that may be economically costly in a running system. Another advantage is that because a logical addressing scheme is used, the simulation handling device does not have to be physically connected to the field network, but may be provided in another level of a control system. This greatly simplifies how to perform simulations.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
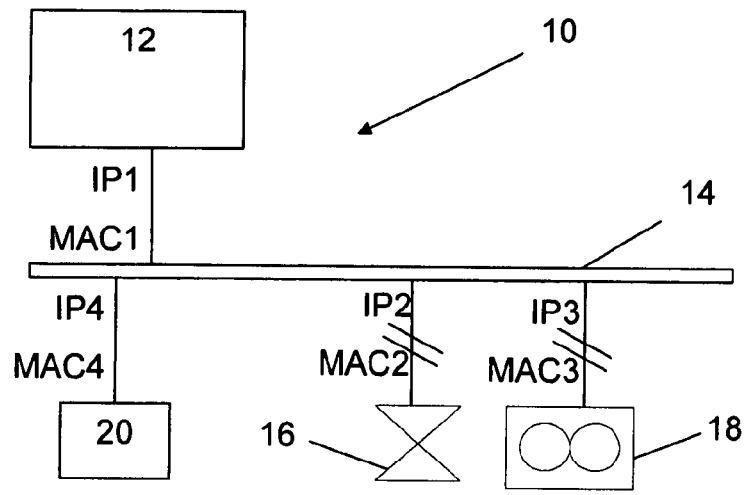
FIG. 1 schematically shows a simplified computer based control system comprising a control communicating with a number of field devices and a simulation handling device via a field bus.

FIG. 1 schematically shows a simplified computer based control system 10. The system may be provided for process or manufacturing control. Such a system is typically an object based computerized system for controlling a process or perhaps part of a process. Typical processes are electrical power generation and supply process, water purification and distribution processes, oil and gas production and distribution processes, petrochemical, chemical, pharmaceutical and food processes, and pulp and paper production processes. These are just some examples of processes where the system can be applied. There exist countless other processes. Normally in such a system there may be one or more control devices having some local software for controlling one or more field devices. A control device may here be a Process Controller or Programmable Logic Controller (PLC). The field devices may be different entities that influence or measure different properties of the technical process, like such things as a pump, a motor, a valve, etc. A process, or a part of a process, may be controlled via a server, which then typically communicates with a control device for providing control of a process. Such systems are also often provided in different levels, where field devices are communicating with a controller via a field bus, and therefore this level is often denoted a field bus level. In higher levels the controller may be communicating with control servers and in even higher levels work stations like operator and/or engineering terminals may be provided. Today most levels above the field bus level are communicating using Ethernet based TCP/IP communication, while on the field bus level there has up till recently only been provided local network communication schemes based on proprietary addresses, like based on hardware addresses, such as MAC addresses. Such hardware addresses are only unique on the actual field bus used. This means that other devices on other field buses may have the same hardware address.

In FIG. 1 there is thus shown a system 10 in the field bus level, which system 10 includes a control device 12 providing control of different entities. The field bus level may here also be regarded as a field network. According to one variation of the present invention this network is a PROFINET network. However other types of networks are also feasible such as Foundation Fieldbus HSE, Modbus TCP and Ethernet IP. However the network is according to the invention using logical addresses. The control device performs control in relation to these logical addresses. The logical addresses are here the well-known IP-addresses. In order to simplify the present description the field network here only includes one field bus 14. It should however be realized that the field network may include more field buses. Here the control device 12 is connected to the field bus 14. Two field devices 16 and 18 to be connected to the field bus are also shown. In the figure the field devices 16 and 18 are shown as being disconnected from the field bus 14. The reason for this is that their functionality or rather the process they control is to be simulated. Field devices that are controlled may be sensors, pumps, valves etc. As an example the first field device is a valve 16 and the second field device 18 is a flow meter that detects the fluid flow in a pipe regulated by the valve. It should here be realized that there may exist several more different field devices that are to be connected to the field bus 14. Finally there is a simulation handling device 20 connected to the field bus 14. The role of the simulation handling device 20 will be described in more detail shortly. It should however be realized that the simulation handling device 20 is with advantage provided in a PC.

As mentioned above the control device 12 addresses the field devices using global logical IP-addresses. In this regard it may also use the hardware addresses of the field devices, their MAC addresses. Therefore the logical address IP1 and hardware address MAC1 of the control device 12, the logical address IP2 and hardware address MAC2 of the first field device 16, the logical address IP3 and hardware address MAC3 of the second field device 18 and the logical address IP4 and hardware address MAC4 of the simulation handling device 20 are also indicated in FIG. 1.

Figure 2:
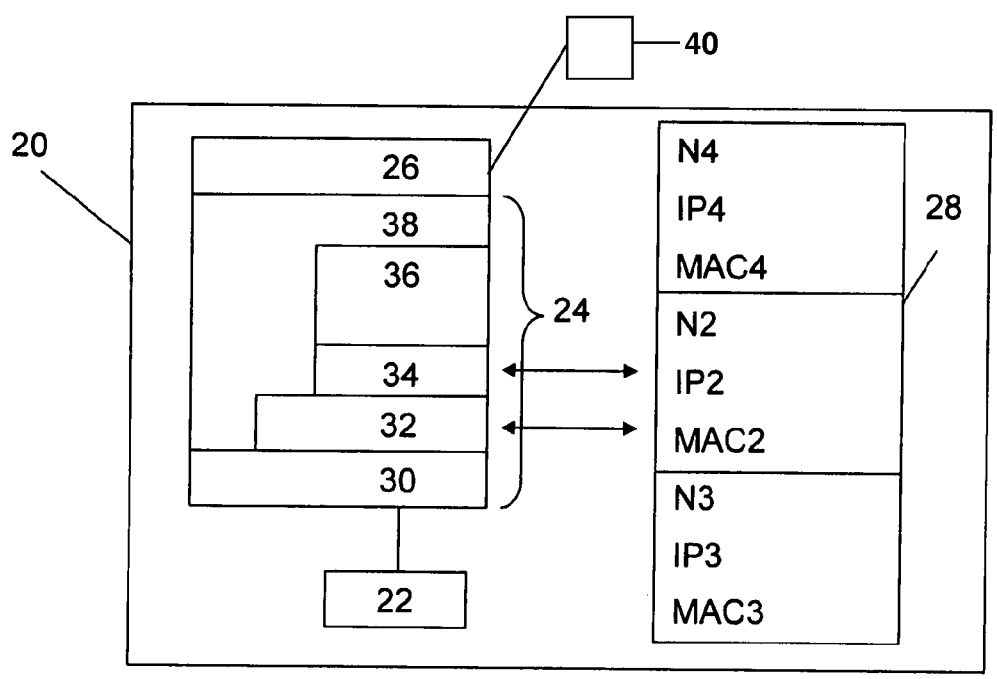
FIG. 2 shows a block schematic of a simulation handling device according to the present invention.

FIG. 2 shows a block schematic of the simulation handling device 20. The simulation handling device 20 includes a communication handling unit 24 which is connected to a field bus interface 22, to a contact information store 28 and to an application handling unit 26. The contact information store 28 includes logical names, logical addresses and hardware addresses of all field devices for which simulations are to be made. These may be provided beforehand or the simulation handling device may obtain these addresses and names from another source, for instance from the control device. From the figure it is clear that the contact information store 28 includes the logical name N2, logical address IP2 and hardware address MAC2 of the first field device 16, the logical name N3, logical address IP3 and hardware address MAC3 of the second field device 18 as well as its own logical name N4, logical address IP4 and hardware address MAC4. As an alternative to using the hardware addresses MAC2 and MAC3 of the first and second field devices it is possible to use other hardware addresses that are different than the own hardware address MAC4. The communication handling unit 24 does for this reason provide a physical layer 30, a MAC layer 32, an IP-layer 34, an UDP (User Datagram Protocol) or TCP (Transmission Control Protocol) stack 36 and a field bus data link layer in the form of a PROFINET layer 38. On top of layer 38, a simulation handling application is running, which application is handled by an application handling unit 26. The communication handling unit 24 and the application handling unit 26 are normally provided in the form of a processor with corresponding computer program in a program memory store that performs the functions of these units when being run by the processor. The contact information store 28 is normally provided in the form of a memory, such as RAM or ROM memory. It should here be realised that the simulation handling device 20 may also include or be connected to a keyboard or a keypad as well as to a display and may also be provided with or access a graphics display. It should therefore also be realised that simulations of a process related to the field devices may be provided by the application and presented on a display. It is also possible that the application presents options to an operator, which then provides simulation results to the application as indicated by 40 in FIG. 2. The application may also communicate with another application running on another computer that performs the actual simulation.

Figure 3:
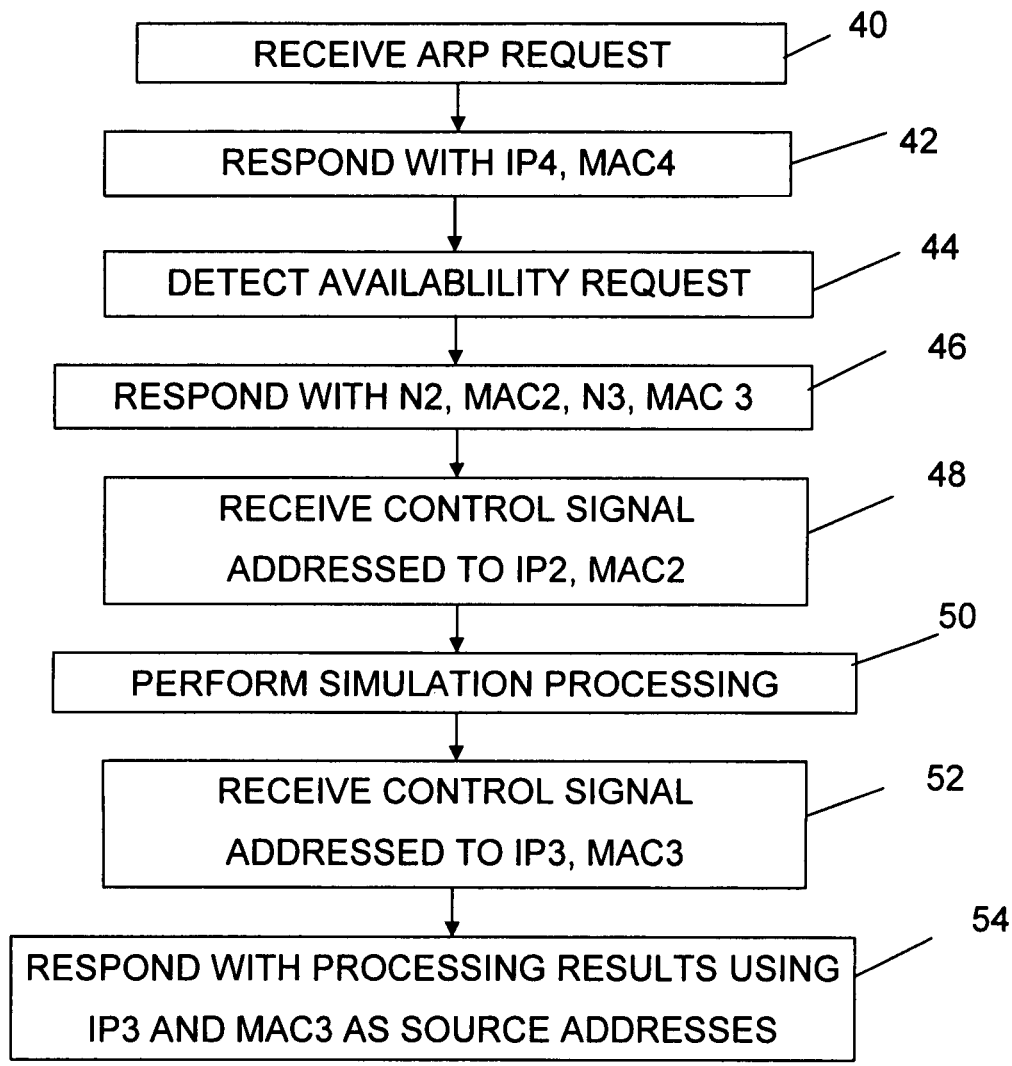
FIG. 3, shows a flow chart outlining a number of method steps in a method of handling simulations related to field devices and performed by the simulation handling device of the present invention, and FIG. 4 schematically shows a computer program product in the form of a CD ROM disc.
Figure 4:
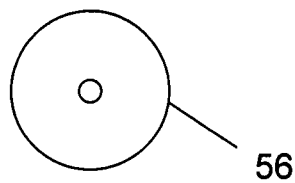

Now the present invention will be described in relation to the previously described FIGS. 1 and 2 as well as in relation to FIG. 3, which shows a flow chart outlining a number of method steps in a method of handling simulations related to field devices performed by the simulation handling device.

It is important that software is tested before put into use, because the software of a control device may be faulty. This is done through providing simulations of the process, for instance through using a simulation program. In order to do this it is important that the control device gets the perception that it is operating on the field devices it its intended to control. This is not so easy to achieve when IP addressing is used.

As a user, typically an engineer, now wants to have some simulations performed, he will use the simulation handling device 20 of the present invention. As he does this he starts running the application 26. He may then be presented with a choice of performing simulations regarding the network 10 of FIG. 1. If he selects such a simulation, the simulation handling device 20 connects to the field bus 14. As it does this it will receive an address resolution request in the form of an ARP request from the control device 12, step 40. This request is responded to by the communication handling unit 24 through fetching the own logical address, IP4 and the own hardware address MAC4 from the contact information store 28 and providing this information in the response, step 42. This is done in order for the simulation handling device 20 to receive a logical address relation to the control device 12 in order to be able to use the field bus 14. After this has been done the application handling unit 26 sets the communication handling unit 24 to use the addresses and logical names of the field devices 16 and 18 for which simulations are to be provided as the identifiers to be used when communicating with the control device 12.

In order to know if the field devices 16 and 18 can be used, the control device 12 has to investigate their availability. This is done through the control device 12 sending an availability request on the bus 14. This request is detected by the communication handling unit 24, step 44, and if the availability request concerns the first and second field device 16 and 18, the communication handling unit 24 retrieves the logical name N2 and hardware address MAC2 of the first field device 16 as well as the logical name N3 and hardware address MAC3 of the second field device 18 from the contact information store 28 and responds to this request using these identities of the field devices, step 46. This response is sent in different messages. One that seems to originate from the first field device 16 and one that seems to originate from the second field device 18.

When this has been done the control device 12 may now start controlling the field devices 16 and 18. It may now send control signals on the field bus 14. The communication handling unit 24 of the simulation handling device 20 may now therefore detect a first control signal related to the actuation of the first field device 16 on the bus 14 and thus being addressed to the first field device 16 and then being addressed using the logical address IP2 and hardware address MAC3. This control signal is therefore received by the communication handling unit 24, step 48. Thereafter the signal is forwarded to the application handling unit 26, which creates a status byte. The communication handling unit 24 then normally also acknowledges the reception and includes the status byte in the acknowledgement and then uses the logical address IP2 and hardware address MAC2 as source address in the acknowledgement. The control signal may here involve some setting to be used for the valve. Thereafter the application handling unit 26 may perform some simulation processing, step 50, or convert the signal to a certain value that directly corresponds to a desired valve setting that a user can understand. The processing may then as a result provide a flow meter value which may be used in relation to the second field device 18. Alternatively the user may use the value as a basis for selecting an appropriate flow meter value. Thereafter the communication handling unit 24 may detect a second control signal sent from the control device 12 on the bus 14 and being related to the provision of a measured value from the second field device 18. The second control signal is thus being addressed to the second field device 18 and then being addressed using the logical address IP3 and hardware address MAC3. This control signal is therefore received by the communication handling unit 24, step 52. Thereafter the second signal is forwarded to the application handling unit 26, which here may fetch a processing result, which may be a flow meter value that has been obtained through the performed simulation processing. Alternatively a manually entered suitable value may be used. The value is then forwarded to the communication handling unit 24, which in turn responds to or acknowledges the second control signal through sending the processing results, i.e. the obtained value, and then using the logical address IP3 and hardware address MAC3 as source address in the response, step 54. In this way a real-time response may thus be provided. When simulation have been completed, it is then possible to connect the field devices to the field bus and start operating the system.

In this way it is possible to provide the control device 12 with processing results without the control device knowing that the field devices are actually not connected. In this way it is thus possible to test the functionality of the control device 12 before being actively used. Therefore faults that may be dangerous in a hazardous environment can be avoided. Faults can also be detected and corrected early, which may lead to avoiding of mistakes that may be economically costly in a running system. Another advantage is that because a logical addressing scheme is used, the simulation handling device 20 does not have to be physically connected to the field bus, but may be provided at a much higher level of a control system, like in an engineering terminal. This greatly simplifies how to perform simulations.

It should furthermore be realized that the simulation handling device may perform this simulation in relation to one or more additional field buses, something that is not possible if only proprietary addresses are used. In this case a remotely located simulation handling device may thus be used for field devices on several different field buses. This also simplifies simulations in case a complex process is being simulated that is controlled via several different field buses. The simulation application may here thus interface all process control devices via a single interface.

In the description above simulations were performed when field devices were disconnected from the field bus. As an alternative it is possible that the field devices are connected to the field bus during simulations. When simulations are to be performed, the communication control unit of the simulation handling device may then disable the field devices that are to participate in the simulation from responding to control signals from the control device and thereafter, when simulations are finished, to enable these field devices to respond to control signals.

The step of notifying that is described above was passive as a response to an availability request. Another passive response notification is as a response to an initialization of a start-up sequence controlled by the control device. However, it should be realized that the notification may also be active, i.e. that the simulation handling device notifies the control device on its own volition, for instance when a user wants to perform simulations.

From the foregoing description it can be seen that the term control signal here comprises a signal that is used for actuating a field device. However, as is also clear from the description a control signal is also a signal that requires the provision of a response, like a response with measurement results. In relation to such a response it should also be realised that there does not need to exist a one-to-one correspondence between control signal and response. A control signal may signal that several responses are to be given to this control signal, for instance at recurring times in order to provide different measurement results at different points in time after the sending of such a control signal by the control device.

It should also be realized that the present invention only requires that the simulation handling device is to use the logical addresses of field devices that are to participate in a simulation. The use of their logical addresses and their logical names is optional.

As mentioned above the simulation handling device may be provided through a program code running on a PC. This program code may also be provided as a computer program product, for instance in the form of one or more data carriers carrying computer program code for performing the functionality of the present invention when being loaded into the computer. One such carrier 56, in the form of a CD ROM disc is generally outlined in FIG. 56. It is however feasible with other data carriers, like diskettes, memory sticks or USB memories. The computer program code can furthermore be provided as pure program code on an external server and downloaded from there for provision in the simulation handling device.

While the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for handling simulations related to at least one field device to be provided in a field network of a computer based control system in relation to a simulation handling device, wherein the field device is controlled by a control device that performs addressing control in relation to logical addresses for field devices equipped with at least one of hardware addresses or logical names, wherein the simulation handling device has an own logical address and an own hardware address, the method being performed in the simulation handling device and comprising:
   receiving by the simulation handling device an address resolution request sent by the control device,
   sending from the simulation handling device a logical address and a hardware address of the simulation handling device to the control device,
   setting the simulation handling device to use a logical address and a hardware address of the at least one field device,
   receiving by the simulation handling device an availability request sent by the control device to investigate availability of the at least one field device,
   sending by the simulation handling device the logical address and the hardware address of the at least one field device to the control device such that the logical address and the hardware address of the at least one field device appear to originate from the at least one field device, thereby notifying the control device that the at least one field device is connected to the field network without the at least one field device involved in a simulation being connected to the field network,
   detecting by the simulation handling device a control signal directed by the control device towards the at least one field device and addressed using the logical address and the hardware address of the at least one field device, and
   responding by the simulation handling device to the control signal with simulation results related to a process using the logical address and the hardware address of the at least one field device as the source of the response.

2. The method according to claim 1, further comprising: performing simulation processing regarding the process to be simulated, in order to provide simulation results.

3. The method according to claim 1, further comprising: receiving simulation results from another source.

4. The method according to claim 3, wherein the another source is an operator of the simulation handling device.

5. The method according to claim 1, wherein the simulation handling device is configured to obtain the logical address of at least one further field device, and wherein at least the steps of notifying a connection and detecting a control signal are also performed for this further field device.

6. The method according to claim 1, further comprising:
   disabling the field device from responding to control signals from the control device when simulations are to be performed.

7. The method according to claim 6, further comprising: enabling the field device to respond to control signals from the control device when simulations have been performed.

8. The method according to claim 1, wherein notifying the control device comprises detecting an availability request concerning field devices in the field network sent from the control device and responding to the request with the logical address and at least one of the logical name or the hardware address of the field device involved in the simulation.

9. The method according to claim 1, wherein the simulation handling device is configured to obtain the logical address and at least one of the logical name or the hardware address of at least one further field device involved in the simulation, and wherein at least the steps of notifying a connection and detecting a control signal are also performed for this further field device.

10. The method according to claim 1, wherein the address resolution request is sent by the control device to the simulation handling device via the field network.

11. The method according to claim 1, wherein the logical address and the hardware address of the simulation handling device is sent by the simulation handling device to the control device via the field network.

12. The method according to claim 1, wherein the logical address and the hardware address of the at least one field device is sent by the simulation handling device to the control device via the field network.

13. A simulation handling device for handling simulations related to at least one field device to be provided in a field network of a computer based control system, wherein the field device is to be controlled by a control device that performs addressing control in relation to logical addresses for field devices equipped with hardware addresses and logical names, the simulation handling device comprising:
   a contact information store comprising the simulation handling device logical address and hardware address, a logical address, a logical name and a hardware address of at least one field device involved in a simulation,
   a communication handling unit configured to:
   receive an address resolution request sent by the control device,
   send a logical address and a hardware address of the simulation handling device to the control device,
   set the simulation handling device to use a logical address and a hardware address of the at least one field device,
   receive an availability request sent by the control device to investigate availability of the at least one field device,
   send the logical address and the hardware address of the at least one field device to the control device such that the logical address and the hardware address of the at least one field device appear to originate from the at least one field device, to thereby notify the control device that the at least one field device is connected to the field network without the at least one field device involved in the simulation being connected to the field network,
   detect a control signal sent from the control device and directed towards the at least one field device and addressed using the logical address and the hardware address of the at least one field device, and
   respond to the control signal with simulation results using the logical address and the hardware address of the at least one field device as the source of the response.

14. The simulation handling device according to claim 13, further comprising: a simulation application handling unit.

15. The simulation handling device according to claim 14, wherein the simulation application handling unit is configured to perform simulation processing regarding a process to be simulated, in order to provide simulation results.

16. The simulation handling device according to claim 14, wherein the simulation application handling unit is configured to receive simulation results from another source.

17. The simulation handling device according to claim 16, wherein the another source is an operator of the simulation handling device.

18. The simulation handling device according to claim 13, wherein the communication handling unit is further configured to receive an address resolution request from the control device and respond with the own logical and hardware addresses, in order to receive a logical address relation to the control device.

19. The simulation handling device according to claim 13, wherein the contact information store includes a logical address of a further device, and wherein the communication handling unit is configured to at least notify a connection and detect a control signal also for this further field device.

20. The simulation handling device according to claim 13, wherein the communication handling unit is further configured to disable the field device from responding to control signals from the control device when simulations are to be performed.

21. The simulation handling device according to claim 20, wherein the communication handling unit is further configured to enable the field device to respond to control signals from the control device when simulations have been performed.

22. The simulation handling device according to claim 13, wherein the communication handling unit when notifying the control device of a connection is configured to detect an availability request concerning field devices in the field network sent from the control device and respond to the request with the logical address and at least one of the logical name or the hardware address of the field device involved in the simulation.

23. The simulation handling device according to claim 13, wherein the contact information store includes the logical address and at least one of the logical name or the hardware address of at least one further field device involved in the simulation, and wherein the communication handling unit is configured to at least notify a connection and detect a control signal also for this further field device.

24. The simulation handling device according to claim 13, wherein the address resolution request is sent by the control device to the simulation handling device via the field network.

25. The simulation handling device according to claim 13, wherein the logical address and the hardware address of the simulation handling device is sent by the simulation handling device to the control device via the field network.

26. The simulation handling device according to claim 13, wherein the logical address and the hardware address of the at least one field device is sent by the simulation handling device to the control device via the field network.

27. A computer program product for handling simulations related to at least one field device to be provided in a field network of a computer based control system, wherein the field device is controlled by a control device that performs addressing control in relation to logical addresses for field devices equipped with hardware addresses and logical names, wherein a simulation handling device has an own logical address and an own hardware address, the computer program product comprising:
a non-transitory computer readable medium; and
computer program code recorded on the computer readable medium and executable by a processor to make the simulation handling device perform when said code is loaded into said simulation handling device:
receive an address resolution request sent by the control device,
send a logical address and a hardware address of the simulation handling device to the control device,
set the simulation handling device to use a logical address and a hardware address of the at least one field device,
receive an availability request sent by the control device to investigate availability of the at least one field device,
send the logical address and the hardware address of the at least one field device to the control device such that the logical address and the hardware address of the at least one field device appear to originate from the at least one field device, to thereby notify the control device that the at least one field device is connected to the field network without the at least one field device involved in a simulation being connected to the field network,
detect a control signal sent from the control device and directed towards the at least one field device and addressed using the logical address and the hardware address of the at least one field device, and
respond to the control signal with simulation results using the logical address and the hardware address of the at least one field device as the source of the response.

28. A computer based control system, comprising:
a field network to which at least one field device that is equipped with a hardware address and a logical name is to be connected,
a control device connected to said field network and configured to control the field devices and perform addressing control in relation to logical addresses of these field devices, and
a simulation handling device comprising:
a contact information store comprising the simulation handling device logical address and hardware address, a logical address, a logical name and a hardware address of at least one field device involved in a simulation,
a communication handling unit configured to:
receive an address resolution request sent by the control device,
send a logical address and a hardware address of the simulation handling device to the control device,
set the simulation handling device to use a logical address and a hardware address of the at least one field device,
receive an availability request sent by the control device to investigate availability of the at least one field device,
send the logical address and the hardware address of the at least one field device to the control device such that the logical address and the hardware address of the at least one field device appear to originate from the at least one field device, to thereby notify the control device that the at least one field device is connected to the field network without the at least one field device involved in the simulation being connected to the field network,
detect a control signal sent from the control device and directed towards the at least one field device and addressed using the logical address and the hardware address of the at least one field device, and
respond to the control signal with simulation results using the logical address and the hardware address of the at least one field device as the source of the response.

* * * * *